(12) United States Patent
Weihrauch (10) Patent No.: US 12,549,076 B2
(45) Date of Patent: Feb. 10, 2026

(54) SINGLE-PHASE AC MOTOR WITH A RELAY FUNCTION

(71) Applicant: Motor Competence Center Holding Flensburg GmbH, Flensburg (DE)

(72) Inventor: Niels Christian Weihrauch, Padborg (DK)

(73) Assignee: Motor Competence Center Holding Flensburg GmbH, Flensburg (DE)

( * ) Notice: Subject to any disclaimer, the term of this patent is extended or adjusted under 35 U.S.C. 154(b) by 449 days.

(21) Appl. No.: 18/162,142

(22) Filed: Jan. 31, 2023

(65) Prior Publication Data
US 2023/0246523 A1 Aug. 3, 2023

(30) Foreign Application Priority Data

Feb. 1, 2022 (EP) ..................................... 22154539

(51) Int. Cl.
*H02K 11/20* (2016.01)
*H02K 7/14* (2006.01)

(52) U.S. Cl.
CPC ............... *H02K 11/20* (2016.01); *H02K 7/14* (2013.01)

(58) Field of Classification Search
CPC ......... H02H 7/085; H02P 1/445; H02P 1/465; H02P 25/04; H02P 29/024
See application file for complete search history.

(56) References Cited

U.S. PATENT DOCUMENTS

| 5,212,436 A * | 5/1993 | Nacewicz | ................ H02P 1/42 |
| | | | 318/788 |
| 2007/0257632 A1* | 11/2007 | Weigel | .................... H02P 1/445 |
| | | | 318/778 |
| 2009/0151371 A1* | 6/2009 | Eum | ....................... H02P 25/18 |
| | | | 62/132 |

FOREIGN PATENT DOCUMENTS

| CN | 102377375 B | 3/2014 | |
| DE | 19844844 A1 | 4/2000 | |
| DE | 102011107010 B4 | 7/2016 | |
| DK | 177998 B1 | 2/2015 | |
| GB | 2497648 A | 6/2013 | |
| KR | 20200088607 A * | 7/2020 | ............ H02J 50/402 |

OTHER PUBLICATIONS

KR-20200088607-A machine translation on Jun. 11, 2025.*
European Search Report for corresponding EP application 22154539.5, Jul. 12, 2022.

* cited by examiner

*Primary Examiner* — Leda T Pham
(74) *Attorney, Agent, or Firm* — Workman Nydegger (57) ABSTRACT

A motor is connectable to a single-phase AC power supply and forms a hermetic compressor. The motor includes a main circuit connected in parallel with the auxiliary circuit, and a winding structure having a main winding arranged as part of the main circuit and an auxiliary winding arranged as part of the auxiliary circuit. The motor includes a rotor arranged to be rotated by a current in the winding structure. To provide a motor durable and cheap to manufacture and to ensure a suitable response to overload situations, the auxiliary circuit has a first section and a second section extending in parallel where an NTC is inserted in the first section. A PTC is inserted in the second section, and a relay is arranged to activate and deactivate current in the first section of the auxiliary circuit based on a current level in the main circuit.

14 Claims, 8 Drawing Sheets

SINGLE-PHASE AC MOTOR WITH A RELAY FUNCTION

INTRODUCTION

The present disclosure relates to a motor which can be connected to a single-phase AC power supply and forming a hermetic compressor. The motor comprises a main circuit and an auxiliary circuit, and the main circuit is connected in parallel with the auxiliary circuit.

A winding structure comprising a main winding arranged in the main circuit and an auxiliary winding arranged in the auxiliary circuit generates a magnetic field which makes a rotor rotate. The rotor could be a squirrel cage rotor.

BACKGROUND

Compressor motors of this kind are known for example for household cooling and refrigeration purpose. Essential in such systems is reliability and economy, i.e. low manufacturing costs and low operation costs.

SUMMARY

It is an object of the present disclosure to provide a motor which is production effective and cost effective. It is a further object to provide a motor with improved starting performance and particularly to ensure a suitable response to motor torque load and supply voltage deviation. Supply voltage deviation may cause overloading of the motor as the motor torque drops when the voltage drops.

For these and other objects, the present disclosure provides a motor wherein the auxiliary circuit comprises a first section and a second section. The first section and second section extend parallel to each other, and a current in the first section is limited by a negative temperature coefficient component (NTC) while a current in the second section is limited by a positive temperature coefficient component (PTC). The motor comprises a current relay arranged to activate and deactivate current in the first section of the auxiliary circuit based on a current level in the main circuit.

A current relay is typically cheaper than a voltage relay, and therefore often desired for cost reasons. As opposed to a voltage relay, a current relay is normally open, i.e. when the motor is turned on, the contacts of the current relay closes after about 15 ms. A potential difference between the main circuit and the auxiliary circuit may be developed during these first 15 ms and may cause arching across the relay contacts. Such arching may relatively quickly overload the relay and possibly cause welding of the contacts and/or create excessive wear of the contact pads.

As will be discussed in detail below, the arrangement of a PTC in the second section and a NTC in the first section will reduce the impact of a discharge between the main circuit and the auxiliary circuit. It will therefore protect the relay contacts. Additionally, the use of the PTC in combination with the NTC improves motor start at critical conditions since the PTC conducts a current immediately, i.e. before the relay contacts are closed. Shortly after, when the relay contacts are closed, the first section takes over and provides a current in the auxiliary circuit independent from the PTC, i.e. mainly based on current through the NTC. When the NTC becomes hot, its Ohmic resistance is reduced, and the current becomes essentially exclusively through the first section.

By means of an example, the NTC, when cold, is high resistant—e.g., 10Ω and from this level, the Ohmic resistance reduces when the temperature increases until the ohmic resistance reaches a level close to zero Ohm.

The PTC may as an example be 25Ω when cold and with raising temperatures, it reaches as an example 50kΩ.

Due to the above arrangement of a PTC in parallel with an NTC and the relay contacts, both the main circuit and the auxiliary circuit receives an electrical current from the moment when the motor is turned on. The auxiliary winding receives a dampened current due to the start resistance of e.g., 25Ω of the PTC.

If the motor is provided with an optional run capacitor (CR) or a start capacitor (CS), the voltage across the CR could be different from the voltage across CS. Due to the current through the PTC, this difference is reduced compared with a motor without a PTC.

When the current relay closes after approximately 15 ms, the relay contacts are influenced by the difference in voltage across the CS and the CR. This difference creates a current through a cold NTC, e.g., having a resistance in the magnitude of 10Ω. The NTC thereby limits the inrush current.

Accordingly, the spark over the relay contacts will be reduced by the immediate charging of CS via the PTC and by the current through the relay contacts, which current is limited by the Ohmic resistance of the NTC when it is cold. Should the start be prevented or delayed, the NTC will become hot and the 10Ω dampening will disappear. Should the motor not start while the NTC is cold, it may start when the NTC gets warm, and the 10Ω resistance disappears. Accordingly, the motor achieves a full start torque once the NTC is warm.

In the start phase while the relay contacts are closed, the auxiliary winding current is dampened with a combined 25Ω in parallel with 10Ω which provides an effective resistance of approximately 7Ω.

After the start phase, the NTC is disconnected by the relay. On the contrary, the PTC is not disconnected, and thereby becomes hot. When the PTC becomes hot, it will stay hot since it is not disconnected by the relay. Accordingly, the resistance increases to e.g., 50.000Ω, and essentially prevents further conduction through the second section of the auxiliary circuit.

Accordingly, the specific combination of a NTC with a PTC provides the ability to use a current relay without excessive arching and still to obtain full motor torque when the NTC becomes hot.

The relay may particularly be of the kind including an anchor made of a magnetic material such as iron and arranged to switch the relay contact. The anchor is moved by a magnetic flux and thereby moves the contact pads between an open and a closed state depending on whether the relay is activated or not. The magnetic flux is generated by a relay coil structure including at least one main relay coil inserted in the main circuit in serial with the main winding.

Additionally, the relay coil structure may include an auxiliary relay coil inserted in the auxiliary circuit in serial with the auxiliary winding.

The auxiliary relay coil is inserted in the first or the second section, or before the first and second section to be in serial with both the first and second section of the auxiliar circuit.

In this case, it may switch between a closed state where it activates the current in the first section of the auxiliary circuit and an open state where it interrupts the current in the first section of the auxiliary circuit depending on a current both in the main circuit and dependent on a current in the auxiliary circuit.

The auxiliary relay coil thereby influences the threshold for disconnecting the relay contacts.

In one embodiment, the auxiliary relay coil is arranged to support the closed position of the relay by the magnetic field generated in the auxiliary relay coil. In this embodiment, the hysteresis is enlarged, and the frequency of relay chattering is reduced.

Alternatively, the auxiliary relay coil is arranged to counteract the closed position of the relay by the magnetic field generated in the auxiliary relay coil. It thereby ensures a more precise interruption of the first section when the motor is started.

The main relay coil may have more turns than the auxiliary relay coil.

The motor may additionally comprise an overload protection structure. In one embodiment, the motor comprises a single overload protector arranged to control current through the main circuit and through the auxiliary circuit. The overload protection structure may include one or more temperature sensitive switches arranged to disconnect the current when its temperature exceeds a threshold. This provides the effect that the overload protection structure disconnects when the current exceeds a certain level in a certain period. The overload protection structure may be configured to reverse automatically to a conductive state once the temperature drops, or it may irreversibly disconnect the current like a fuse.

In one embodiment the overload protection structure comprises a high-power overload protector (HP-OLP) serially with the main winding, and a low power overload protector (LP-OLP) connected in the auxiliary circuit serially with the auxiliary winding.

The overload protection structure may particularly be combined with the relay coil structure including at least one main relay coil and an auxiliary relay coil, and the PTC.

The LP-OLP may be more sensitive than the HP-OLP, such that it disconnects at a lower current.

The HP-OLP may be connected serially with the auxiliary winding in the auxiliary circuit and connected serially with the main winding in the main circuit, or, in an alternative embodiment, the HP-OLP is connected in the main circuit serially with the main winding and in parallel with the auxiliary circuit.

BRIEF DESCRIPTION OF THE DRAWINGS

The invention will now be described by way of example with reference to the following figures in which.

DETAILED DESCRIPTION OF THE INVENTION

Further scope of applicability of the present disclosure will become apparent from the following detailed description and specific examples. However, the detailed description and specific examples, while indicating preferred embodiments, are given by way of illustration only, since various changes and modifications within the scope of the disclosure will become apparent to those skilled in the art from this detailed description.

Figure 1A:
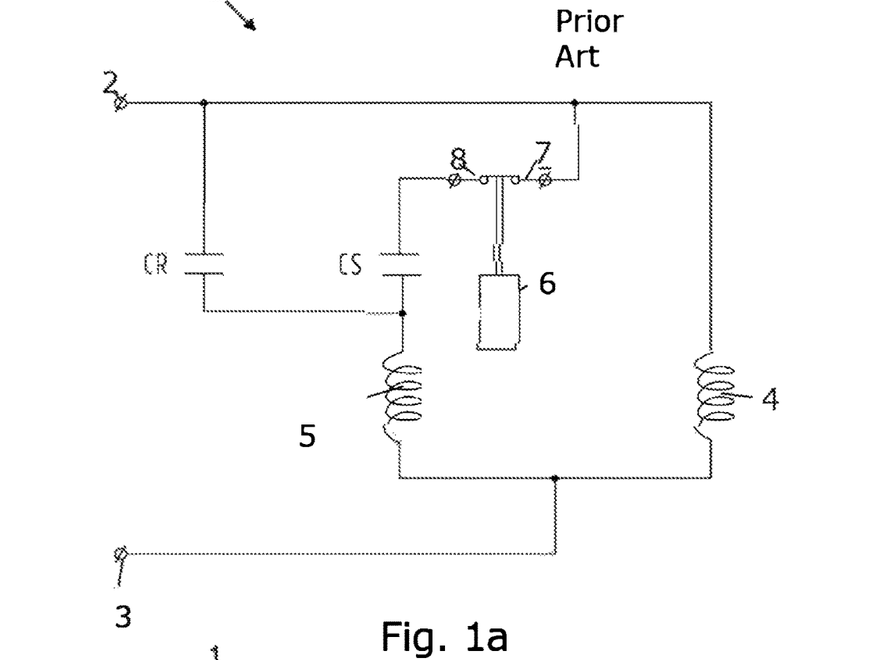
FIG. 1a illustrates schematically, a traditional compressor motor for a refrigerator.

FIG. 1a illustrates a diagram of a single-phase AC asynchronous motor 1 with two phase connectors 2, 3 for connection of the motor to a single-phase power supply. The motor has a rotor (not illustrated) adapted in normal mode to be driven by a main winding 4 and in start-up mode additionally to be driven by an auxiliary winding 5. The main winding is inserted in a main circuit and the auxiliary winding is inserted in an auxiliary circuit.

The motor includes a relay, in this embodiment a voltage relay, 6 which connects or disconnects the relay contacts 7, 8 and thereby shifts between normal mode and start-up mode.

A start capacitor, CS is inserted in serial connection with the auxiliary winding to provide a phase shift of the power supply voltage/current in the auxiliary winding compared with the main winding.

Motors of this kind are known in the art, and they may generally suffer from the repeated shifting of the relay during a repeated cycle between an overloaded state and a non-overloaded state. This is sometimes referred to as relay chattering. According to these repetitions, contact pads of the relay may suffer, and the winding and other components may eventually wear out. The CR is optional.

Generally, the voltage relay has an advantage since it has relay contacts being normally closed, i.e. when the motor is turned on, the relay contacts are closed. Due to the closed contacts, the CS and CR are charged simultaneously and the this prevents a potential difference between the main circuit and the auxiliary circuit protects the relay contacts against arching. However, such a relay is more expensive than a current relay.

The voltage relay is, however, expensive and could, by the implementation of the present disclosure, be replaced with a current relay.

Figure 1B:
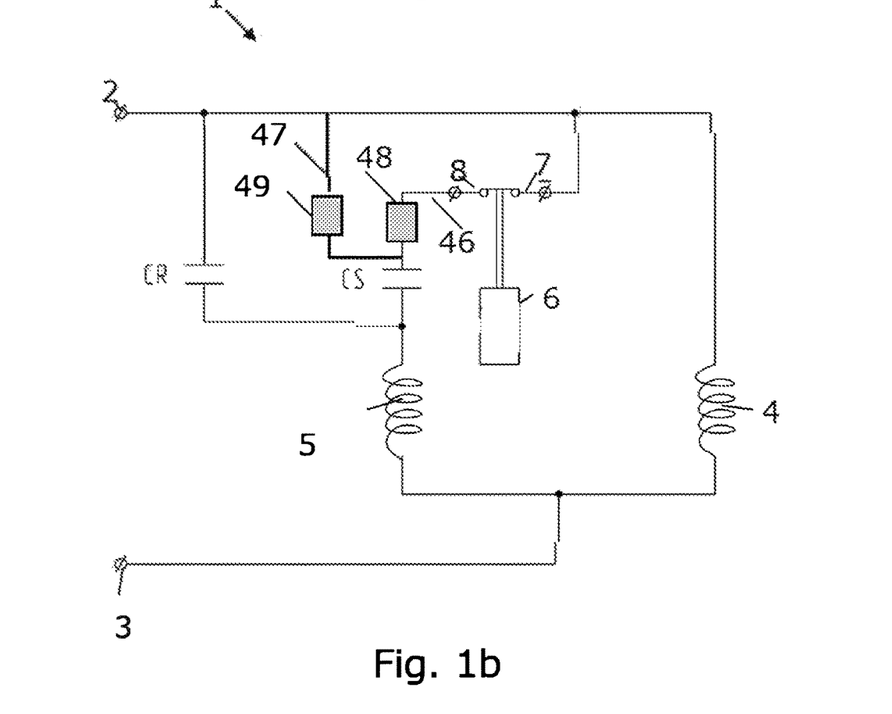
FIG. 1b illustrates schematically the compressor motor for a refrigerator but including a PTC and an NTC.

FIG. 1b illustrates a diagram similar to FIG. 1a but including an NTC 48 and a PTC 49 in accordance with the claims.

Figure 2A:
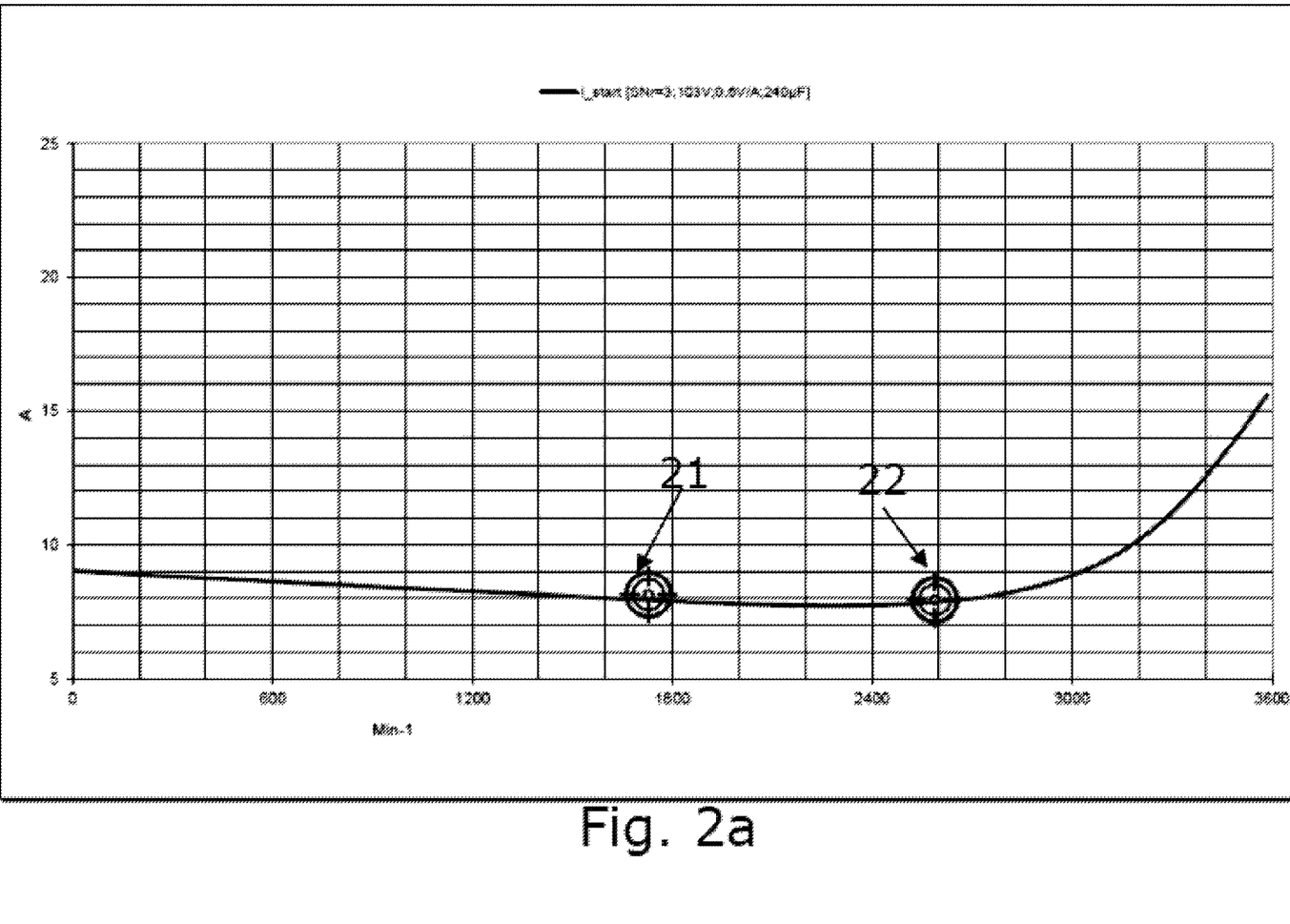
FIGS. 2a-2c illustrates current in the main circuit as a function of rotor speed.

FIG. 2a illustrates along the ordinate the current (Ampere) in the auxiliary winding as a function of rotor speed on the abscissa (rounds per minute). Two points 21, 22 indicates the rpm where the relay contacts disengage. This is explained further relative to FIG. 3.

Figure 2B:
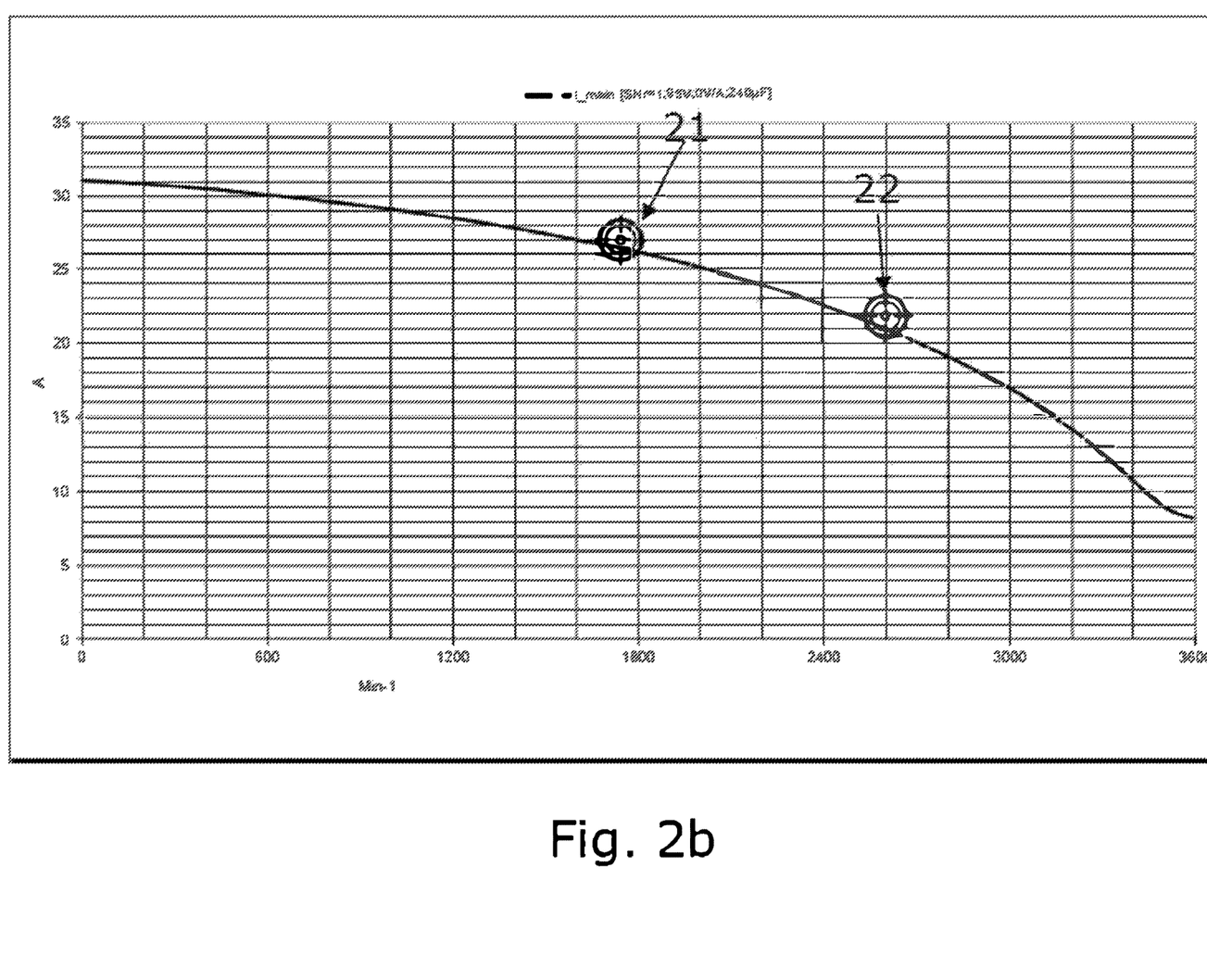

FIG. 2b illustrates along the ordinate the current (Ampere) in the main winding as a function of rotor speed on the abscissa (rounds per minute).

Figure 2C:
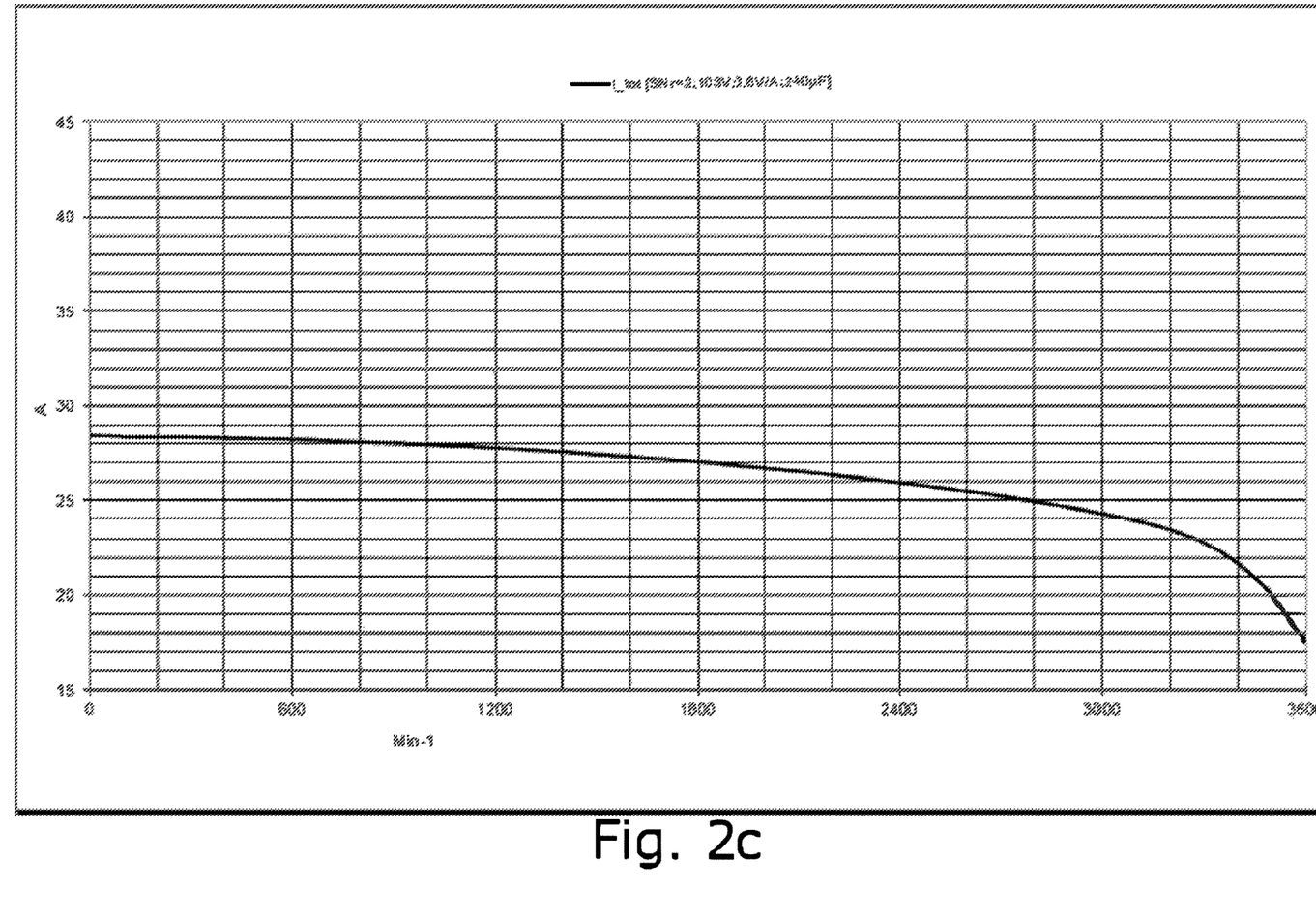

FIG. 2c illustrates along the ordinate the total current (Ampere) in the main and auxiliary winding as a function of rotor speed on the abscissa (rounds per minute).

Figure 3:
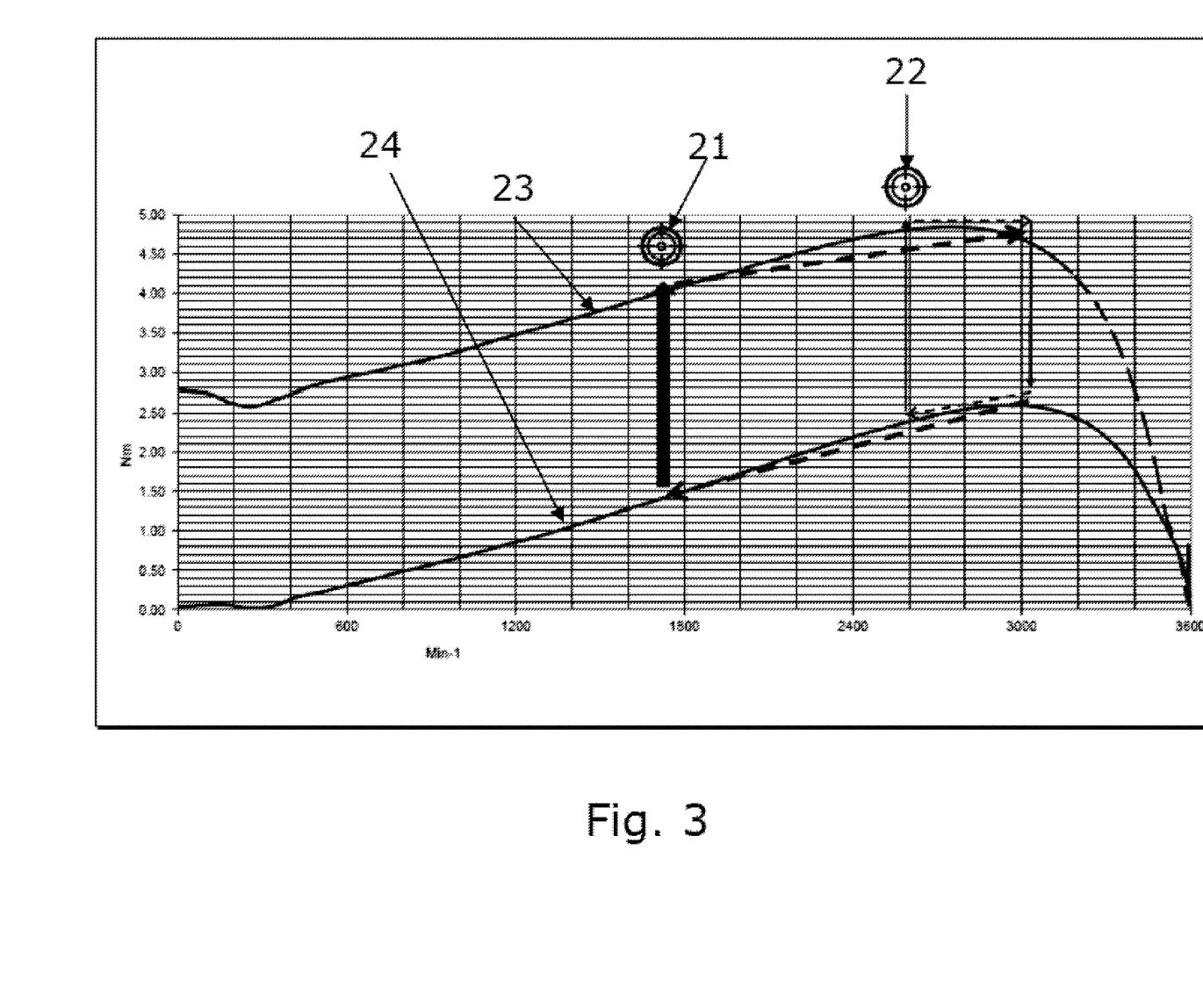
FIG. 3 illustrates rotor torque as a function of rotor speed.

FIG. 3 illustrates a torque curve where torque in Nm is along the ordinate as a function of rotor speed on the abscissa. The torque and current curves are normal for traditional motors e.g. of the kind illustrated in FIG. 1, and they are normal also for motors of the kind illustrated in the following figures.

The upper curve 23 is followed by the motor when the relay contact is closed and the auxiliary winding contributes to the magnetic flux driving the rotor, and the lower curve 24 is followed in the opposite direction, if the RPM is reduced while the relay contact is open, and the auxiliary winding does not contribute to the magnetic flux driving the rotor.

Point 21 refers to an embodiment of the relay with a relay coil structure comprising a main relay coil and an auxiliary relay coil arranged to support the closed position of the relay by the magnetic field generated in the auxiliary relay coil. In this embodiment, the main relay coil may not need the same strength since it is supported by the auxiliary relay coil, and the hysteresis can be enlarged. This may reduce the frequency of relay chattering.

In that case, the relay will typically reinstate the auxiliary winding at a relatively low rpm and the motor would follow the large hysteresis indicated by the rectangle made by dotted lines and extending from the point 21 and upwards, i.e. to the right of the point 21.

Point 22 refers to an embodiment of the relay with a relay coil structure comprising only a main relay coil, i.e. no auxiliary relay coil. In this embodiment, the main relay coil may need further strength since it is not supported by the auxiliary relay coil, and the hysteresis can be reduced. In that case, the relay will typically reinstate the auxiliary winding at a higher rpm and the motor would follow the small hysteresis indicated by the rectangle made by dotted lines and extending from the point 22 and upwards, i.e. to the left of the point 22.

Figure 4:
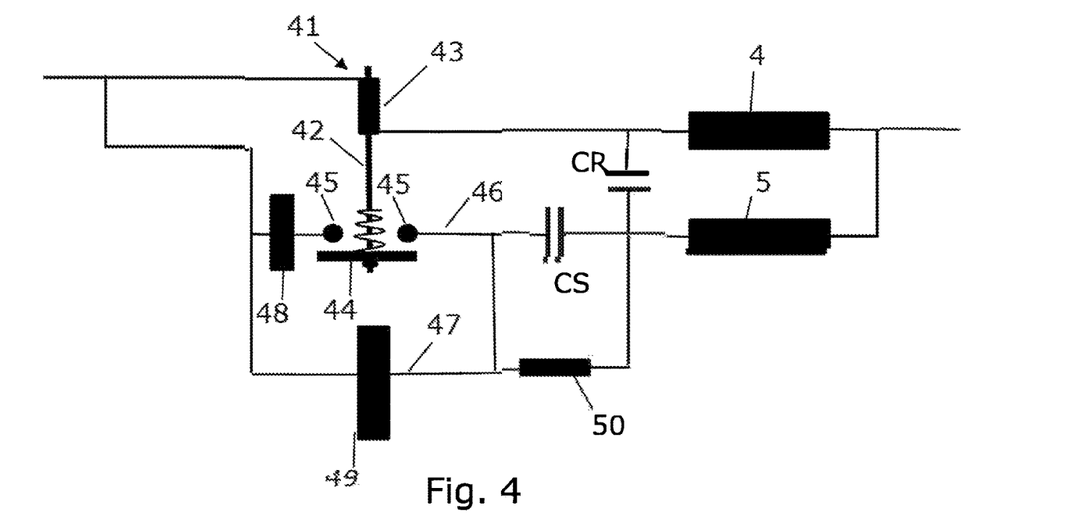
FIG. 4 illustrates schematically, a compressor motor according to the present disclosure.

FIG. 4 illustrates a motor according to the present disclosure. In this motor, the voltage relay is replaced with a current relay 41. This type of relay is cheaper, but it is normally open, which means that the contacts pads are closed after the motor is turned on and arching is therefore likely to occur. Arching may or will, eventually, abrade the relay and make the motor useless. The main winding 4, and the auxiliary winding 5 are indicated by black boxes, and the illustrated motor includes optional start capacitor CS and run capacitor CR.

The current relay comprises an anchor 42 arranged to switch the relay contact between the closed and open position. The anchor is moved by a magnetic flux generated in a relay coil structure. In this embodiment, the relay coil structure comprises only a single coil 43 inserted in the main circuit in serial with the main winding—this coil is referred to as main relay coil. The anchor moves the bridge 44 and thereby closes or opens the contact pads 45

FIG. 2 illustrates that the current in the main circuit is highest when the rotor has not started to rotate, and it drops as the motor gains speed. The current relay contacts will therefore close based on the current which exists when the motor is turned on, and it is designed to open when the current is reduced to a lower current, herein referred to as a drop out current. This deactivates a part of the auxiliary circuit based on current in the main circuit, i.e. when the rotor is in normal operational speed. This is typically near or at the top point of the torque curve.

When the rotor has reached a speed level corresponding to maximum torque by use of the main winding alone, the auxiliary winding is disconnected, and the operation is continued with the main winding alone. In FIG. 3, this corresponds to a jump from the upper curve 23 to the lower curve 24 at a RPM corresponding to the top point of the lower curve 22.

The rectangle made by dotted lines in FIG. 3 illustrates a hysteresis deriving if the motor is torque overloaded or if the motor receives an excessively low voltage during voltage fluctuation. In that case, the torque and speed will be reduced until the current has increased to a level where the relay reinstates and the motor, possibly, gains sufficient torque by the reintroduction of the auxiliary winding to overcome the overload and get back to the right flank of the torque curve.

In FIG. 4 the auxiliary circuit is divided into two parallel sections, herein referred to as a first section 46 and a second section 47. The first section includes a NTC 48 and the second section includes a PTC 49.

When the current in the main circuit increases above a threshold, the magnetic field is sufficiently strong to pull the anchor and close the relay. This initiates a current in the first section of the auxiliary circuit. Accordingly, upon turning on the motor, the second section with the PTC will conduct a current to the start capacitor CR.

When the relay closes, the start capacitor is already partly charged, and the potential difference between the run capacitor CR and the start capacitor CS at most amount to what derives from the cold resistance of the PTC compared with the resistance in the relay coil. Accordingly, the relay contacts may close with very little or no aching. During closing of the relay, the cold resistance of the NTC will dampen the current in the first section and thus further reduce arching. When the relay is closed, the first section with the NTC will further conduct a current to the start capacitor. At this point in time, the combined resistance of the parallel coupled PTC and NTC amounts to less than the individual resistances and can be determined from the formula:

$$1/R = 1/Rptc + 1/Rntc$$

where Rptc is the Ohmic resistance in the PTC and Rntc is the Ohmic resistance in the NTC.

The motor additionally comprises an optional Bleed resistor 50 configured to consume a charge on the CS when the relay deactivates after successful start of the motor.

Figure 5:
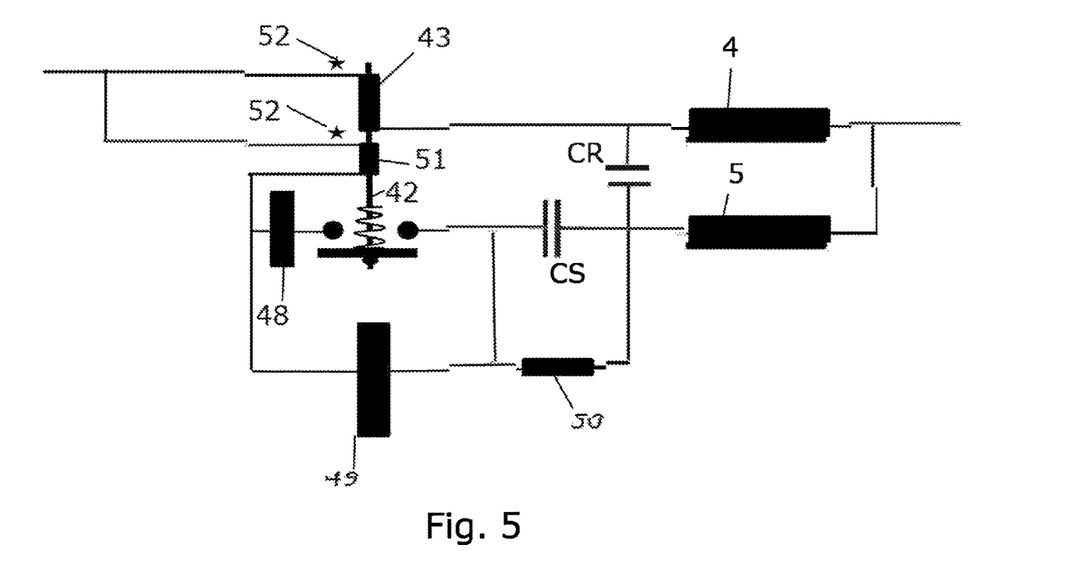
FIGS. 5 and 5a illustrate an embodiment of the compressor motor including a current relay with a split coil.

FIG. 5 illustrates an embodiment where the relay coil is split in two sections including a main relay coil 43 inserted in the main circuit and an auxiliary relay coil 51 inserted in the auxiliary circuit, particularly in an initial section of the auxiliary circuit which is serial to both of said first and second sections of the auxiliary circuit. The anchor 42 is influenced by the magnetic flux generated in one or both of the coils 43, 51.

The main relay coil and the auxiliary relay coil are electrically independent on each other such that they generate individual magnetic flux contributions.

The illustrated stars 52 at each section of the relay coil indicates that the coils are wound in the same direction. This has the advantage that a magnetic field generated by a current in the auxiliary circuit complements the magnetic field generated by the current in the main circuit in maintaining the anchor in the closed position. I.e. once there is a current in the auxiliary circuit, the anchor is supported in the closed position. This could be due to a closed relay allowing conduction in the first section and/or due to a cold PTC allowing conduction through the second section.

When the relay opens and/or the PTC becomes hot, the support from the auxiliary relay coil disappears, and the current in the main circuit will have to increase at least comparable to the disappeared contribution before the relay re-activates. This creates a larger hysteresis between opening and closing of the relay and enables a more stable operation of the relay.

The coils could also be wound in opposite directions.

Figure 5A:
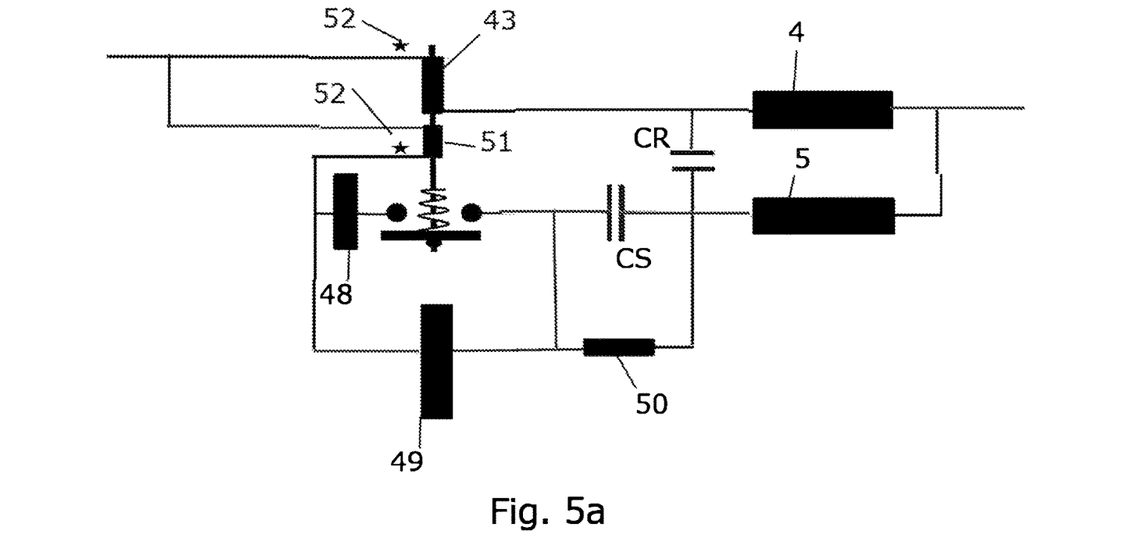

FIG. 5a illustrates an embodiment where the relay coil is split in two sections including a main relay coil inserted in the main circuit and an auxiliary relay coil inserted in the auxiliary circuit. The stars 52 at each section of the relay coil indicates that the coils are wound in the opposite direction. This has the advantage that a magnetic field generated by a current in the auxiliary circuit counteracts the magnetic field generated by the current in the main circuit in moving the anchor to the open position. I.e. once there is a current in the auxiliary circuit, the anchor is biased partly towards the open position which reduces the hysteresis. The result is a more swift and absolute disconnection of the relay and thereby potentially reduces the wear of the contact pads.

Figure 6:
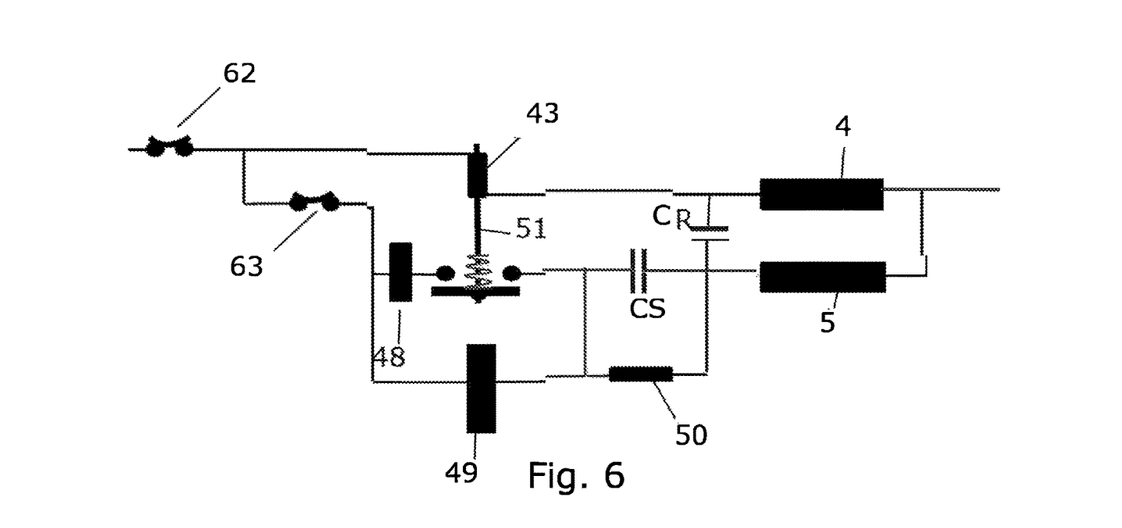
FIGS. 6-7 illustrate an embodiment of the compressor motor.

FIG. 6 illustrates the embodiment of FIG. 1 but including a high-power overload protector (HP-OLP) 63 serially with the main winding, and a low power overload protector (LP-OLP) 62 connected in the auxiliary circuit serially with the auxiliary winding.

The illustrated LP-OLP is more sensitive than the HP-OLP, and the illustrated HP-OLP is connected serially with the auxiliary winding in the auxiliary circuit and connected serially with the main winding in the main circuit.

Figure 7:
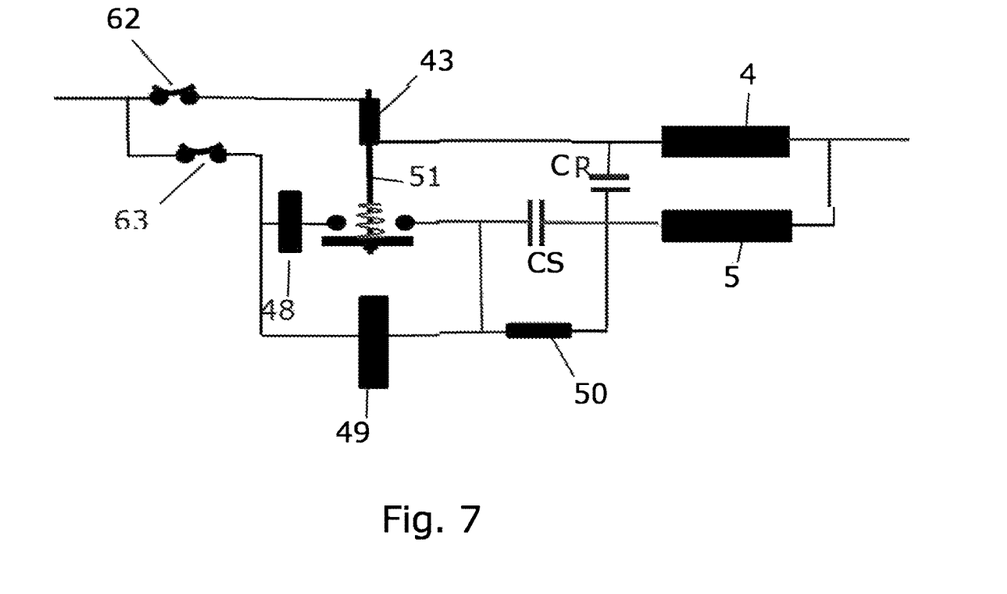

FIG. 7 illustrates an embodiment including an overload protection structure with a high power OLP (HP-OLP) serially with the main circuit and parallel with the auxiliary circuit and a low power OLP (LP-OLP) serially with the auxiliary circuit.

The advantage of this combination, i.e. the combination between the split relay coil, the PCT and the OLP structure is as follows.

When the motor is started, the relay activates at zero rpm, and by the combined currents in the main and auxiliary windings, the motor gains speed until reaching the max torque point of the torque curve, c.f. FIG. 3. At this point, the relay disconnects. Should an overload situation occur, it may force the motor downwards along the torque curve. Since the contribution to the magnetic field generated by the auxiliary relay coil is disappeared, the current will have to increase comparably in the main winding.

At a certain point, the relay re-activates, and the auxiliary winding contributes again to the torque. The LP-OLP is thereby heated, and due to a larger sensitivity than the HP-OLP, it is more likely to disconnect the auxiliary winding.

This results in a motor which can only continue operation by its main winding, and if the overload situation remains, it causes a blocked rotor condition which increases the current in the HP-OLP to a level where the HP-OLP disconnects the main winding and thereby prevents damage of the total motor.

FIG. 7 illustrates the HP-OLP being serial to both the main circuit and the auxiliary circuit. In an alternative implementation, the HP-OLP is only serial in the main circuit. This embodiment provides the same effect, i.e. a total disconnection of the motor when the LP-OLP and the HP-OLP are both disconnected.

Figure 8:
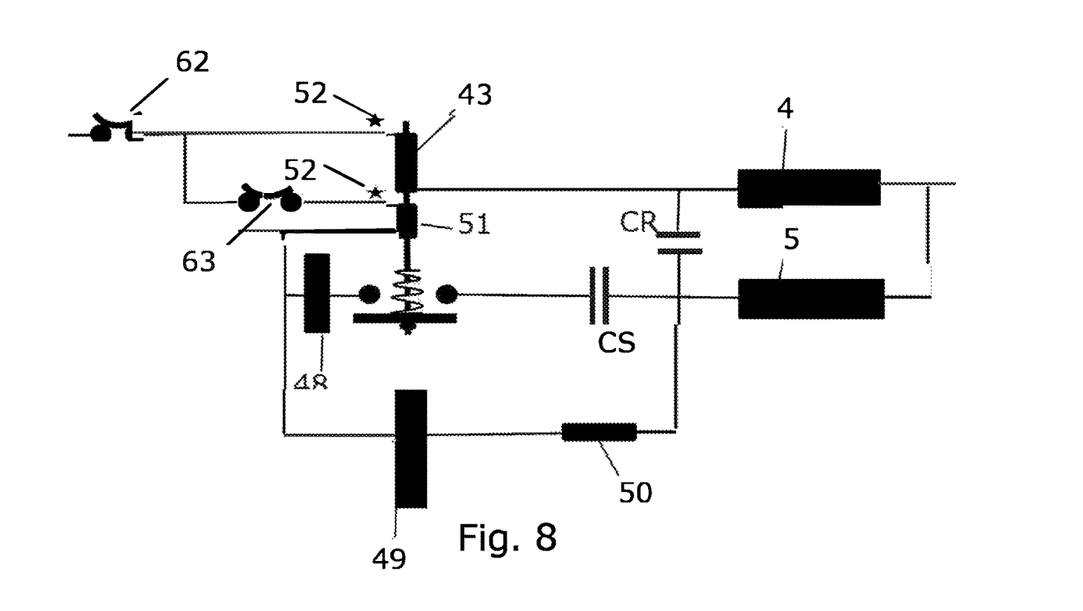
FIG. 8 illustrates the combination between a relay coil structure including a main relay coil and an auxiliary relay coil, a PTC, and an overload protection structure.

FIG. 8 illustrates an embodiment with a High-power overload protector (HP-OLP) 63 serially with the main winding, and a low power overload protector (LP-OLP) 62 connected in the auxiliary circuit serially with the auxiliary winding, and wherein the relay coil is split in two sections including a main relay coil 43 inserted in the main circuit and an auxiliary relay coil 51 inserted in the auxiliary circuit.

The invention claimed is:

1. A motor connectable to a single phase AC power supply and forming a hermetic compressor, the motor comprising:
   a main circuit; and
   an auxiliary circuit, the main circuit being connected in parallel with the auxiliary circuit;
   a winding structure comprising a main winding arranged in the main circuit and an auxiliary winding arranged in the auxiliary circuit; and
   a rotor arranged to be rotated by a magnetic field generated in the winding structure,
   wherein
      the auxiliary circuit comprises a first section and a second section,
      the first section and the second section extend in parallel,
      current in the first section is limited by a negative temperature coefficient component (NTC),
      the second section includes a positive temperature coefficient component (PTC), and
      a relay is arranged to activate and deactivate current in the first section of the auxiliary circuit without deactivating a current through the PTC in the second section, the relay being controlled by a current level in the main circuit,
   wherein the motor further comprises a start capacitor (CS) serial with the auxiliary winding, the CS being disconnected by the relay.

2. The motor according to claim 1, wherein the relay is switchable between a closed state where the relay activates current in the first section of the auxiliary circuit and an open state where the relay interrupts the current in the first section of the auxiliary circuit dependent on a current level in the main circuit and dependent on a current level in the auxiliary circuit.

3. The motor according to claim 2, wherein the relay comprises a main relay coil in the main circuit and an auxiliary relay coil in the auxiliary circuit.

4. The motor according to claim 3, wherein the main relay coil has more turns than the auxiliary relay coil.

5. The motor according to claim 3, wherein the main relay coil and the auxiliary relay coil are arranged to provide a magnetic flux in a same direction.

6. The motor according to claim 3, wherein the main relay coil and the auxiliary relay coil are arranged to provide a magnetic flux in opposite directions.

7. The motor according to claim 1, further comprising a high-power overload protector serially with the main winding, and a low power overload protector connected in the auxiliary circuit serially with the auxiliary winding.

8. The motor according to claim 7, wherein the low power overload protector is more current sensitive than the high-power overload protector.

9. The motor according to claim 7, wherein the low power overload protector is more temperature sensitive than the high-power overload protector.

10. The motor according to claim 7, wherein the high power overload protector is connected parallel with the auxiliary winding in the auxiliary circuit.

11. The motor according to claim 7, wherein the high-power overload protector is connected serially with the main winding in the main circuit and with the auxiliary winding in the auxiliary circuit.

12. The motor according to claim 1, wherein the PTC is serial with CS.

13. The motor according to claim 1, wherein the NTC is serial with CS.

14. The motor according to claim 1, further comprising a run capacitor (CR) serial with the auxiliary winding.

* * * * *